(12) United States Patent
Youm

(10) Patent No.: US 7,068,010 B2
(45) Date of Patent: Jun. 27, 2006

(54) MOTOR POWER SUPPLY AND METHOD OF CONTROLLING THE SAME

(75) Inventor: Jang-hyoun Youm, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 10/662,447

(22) Filed: Sep. 16, 2003

(65) Prior Publication Data

US 2004/0090807 A1 May 13, 2004

(30) Foreign Application Priority Data

Nov. 8, 2002 (KR) .................... 10-2002-0069167

(51) Int. Cl.
*H02P 1/26* (2006.01)
*H02H 9/00* (2006.01)

(52) U.S. Cl. .................. 318/778; 318/434; 361/58; 363/56.01

(58) Field of Classification Search ............ 363/132, 363/127, 131, 17, 34, 37, 39, 89, 142, 48, 363/56; 323/222, 311, 321, 908; 318/729, 318/376, 759, 810; 361/58, 87
See application file for complete search history.

(56) References Cited

U.S. PATENT DOCUMENTS

| | | | |
|---|---|---|---|
| 4,750,102 A * | 6/1988 | Yamano et al. | ............. 363/142 |
| 5,493,486 A | 2/1996 | Connell et al. | |
| 5,640,111 A | 6/1997 | Hasegawa | |
| 6,278,910 B1 * | 8/2001 | Miura et al. | ................ 700/297 |

FOREIGN PATENT DOCUMENTS

| | | |
|---|---|---|
| JP | 1-303068 | 12/1989 |
| JP | 7-322485 | 12/1996 |
| JP | 10-66383 | 3/1998 |
| JP | 10-295094 | 11/1998 |
| JP | 2001-145390 | 5/2001 |
| JP | 2001-252494 | 9/2001 |

(Continued)

OTHER PUBLICATIONS

Office Action issued by the Japanese Patent Office on Sep. 13, 2005.

(Continued)

*Primary Examiner*—Rajnikant B. Patel
(74) *Attorney, Agent, or Firm*—Staas & Halsey LLP

(57) ABSTRACT

A motor power supply for and a method of operating a poly-phase AC motor with power provided from an AC power source through a DC-conversion circuit and an inverter. An output voltage of the DC-conversion circuit is sensed and a controller controls an inrush current limiting resistance to be selectively bypassed according to a first value of the output voltage and controls a pair of switches in an overvoltage protection circuit to return energy stored in the DC-conversion circuit to the AC power source according to second and third values of the output voltage. An operation of the switches is synchronously controlled according to a phase of the AC power source. The overvoltage protection circuit eliminates an overvoltage in the DC-conversion circuit due to energy regenerated by the motor and passed through the inverter to the DC-conversion circuit.

19 Claims, 6 Drawing Sheets

FOREIGN PATENT DOCUMENTS

| KR | 1990-11172 | 11/1989 |
|----|------------|---------|
| KR | 90-5798 | 3/1990 |
| KR | 92-13948 | 7/1992 |
| KR | 93-1614 | 1/1993 |
| KR | 134536 | 12/1997 |
| KR | 173943 | 11/1998 |
| KR | 1998-45754 | 9/1999 |
| KR | 10-258383 | 3/2000 |
| KR | 2001-1158 | 1/2001 |
| KR | 10-359917 | 10/2002 |

OTHER PUBLICATIONS

Notice of Official Action issued by the Korean Intellectual Property Office on Aug. 26, 2005 in Application No. 10-2002-0069167.

* cited by examiner

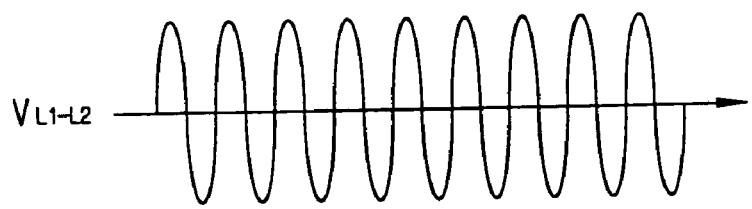
FIG. 2A
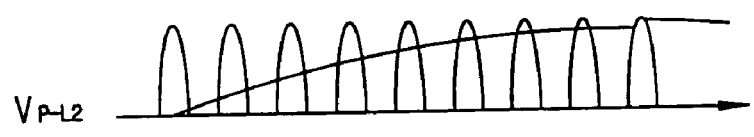
FIG. 2B
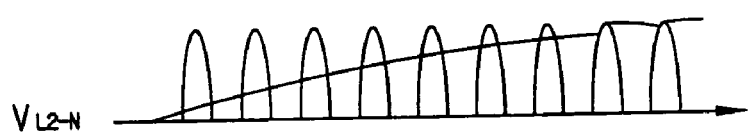
FIG. 2C
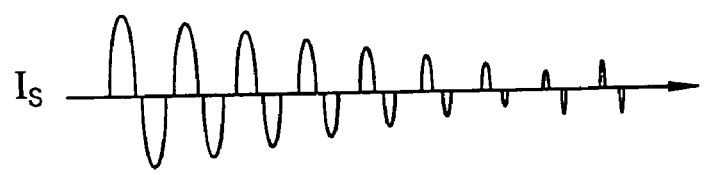
FIG. 2D
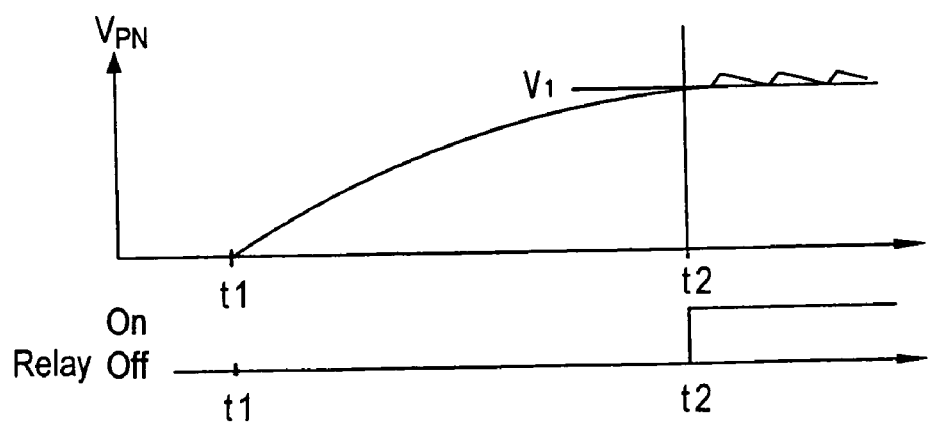
FIG. 2E
FIG. 2F

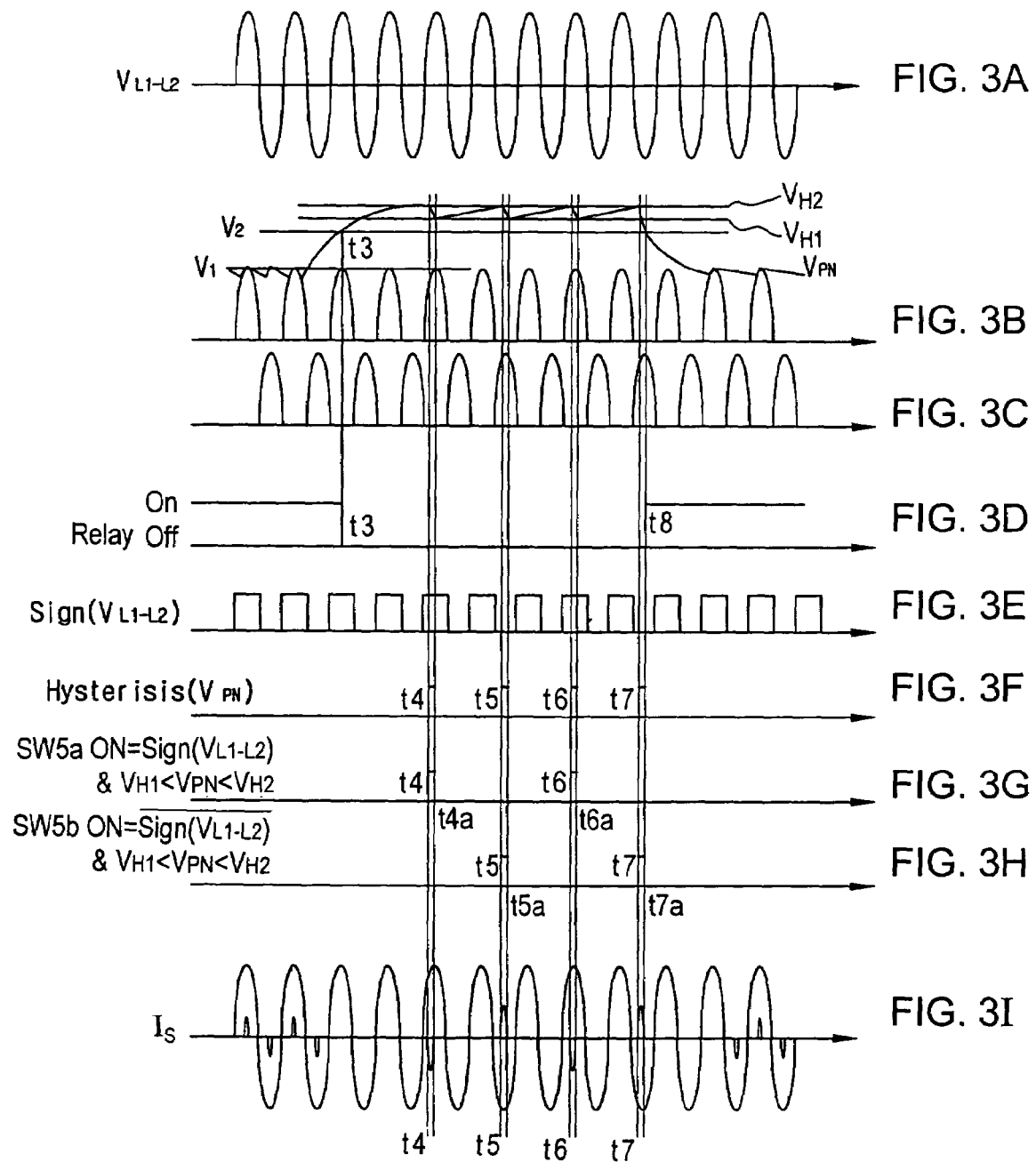

FIG. 5

| ELEMENT | NUMBER OF ELEMENTS | |
|---|---|---|
| | CONVENTIONAL CIRCUIT | PRESENT INVENTION |
| DIODE | 3 | 0 |
| RELAY | 1 | 1 |
| RESISTOR | 2 | 1 |
| SWITCH | 1 | 2 |
| CAPACITOR | 2 | 2 |
| TOTAL | 9 | 6 |

MOTOR POWER SUPPLY AND METHOD OF CONTROLLING THE SAME

CROSS-REFERENCE TO RELATED APPLICATIONS

This application claims the benefit of Korean Patent Application No. 2002-69167, filed Nov. 8, 2002, in the Korean Intellectual Property Office, the disclosure of which is incorporated herein by reference.

BACKGROUND OF THE INVENTION

1. Field of the Invention

The present invention relates to a power supply for a motor, and more particularly, to a power supply for a motor and a method of supplying power to the motor, which improve energy efficiency.

2. Description of the Related Art

A three-phase motor is the kind of motor in which coils are spaced about a rotor of the motor and are connected to operate from a three phase power source . As shown in FIG. 6, a motor power supply 100 for the three-phase motor is employed to output a three-phase voltage to drive a motor 117, and comprises an alternating current (AC) power supply input part 101 which receives a commercial AC power, such as for example, 110/220V, a soft charging circuit 103 which prevents an excessive inrush current from flowing when power is initially supplied, a direct current (DC)-conversion circuit 106 which converts AC power into DC power, an overvoltage-protection circuit 112 which protects the DC-conversion circuit 106 from overvoltage, and an inverter 116 which converts the DC power into three-phase AC power having various frequencies. The inverter 116 comprises a pulse width modulation (PWM) part (not shown) which generates a PWM signal, and a plurality of transistors which are switched on/off according to a square waveform signal output from the PWM part. Further, the motor power supply 100 comprises a micom (not shown) which controls an output of the inverter 116 to be on/off by switching on/off the transistors according to the PWM control signal, and controls a rotation speed of the motor 117 by changing a frequency of the output of the inverter 116.

The motor power supply 100 employs a rectifying circuit 105 and a capacitor circuit 107 which function as a voltage doubler, when a voltage of 220 Vrms is needed and a voltage of 100~110 Vrms is input. In order to smoothly control the motor 117, the DC-conversion capacitor circuit 107 should have sufficiently large capacity. Therefore, when power is initially supplied, the capacitors $C_{DC1}$ and $C_{DC2}$ of the DC-conversion capacitor circuit 107 are charged, causing very high inrush current if the current is not otherwise limited. The high inrush current is likely to generate a current spike, thereby overloading the AC power input and tripping a circuit breaker to break the power, affecting other devices connected to the AC power input part, or shortening a life span of the capacitors of the DC-conversion capacitor circuit 107.

The soft charging circuit 103 limits the inrush current. As shown in FIG. 6, when power is initially supplied, a relay 102 is in the state of being switched off, so that the capacitors $C_{DC1}$ and $C_{DC2}$ are charged with a positive voltage passing through an inrush current limiting resistor 104 and a diode D1 and a negative voltage passing through the inrush current limiting resistor 104 and a diode D2, respectively. A total voltage applied to the pair of capacitors $C_{DC1}$ and $C_{DC2}$ in the DC-conversion circuit will be referred to as $V_{PN}$. When $V_{PN}$ is equal to a charging stop voltage V1, the relay 102 is switched on, so that the power from AC power input part 101 is directly supplied to the diodes D1 and D2 in the rectifying circuit 105.

While the motor 117 operates, regenerative power may be generated by the inverter 116 and supplied to the DC-conversion circuit 106. When the capacitors $C_{DC1}$ and $C_{DC2}$ are over-charged with the regenerative power, the overvoltage-protection circuit 112 senses that $V_{PN}$ is higher than a predetermined voltage (i.e., a critical overvoltage), and switches on a transistor 109 of the overvoltage-protection circuit 112, to dissipate the regenerative power as heat energy through a resistor 110 of the overvoltage-protection circuit 112.

However, in the conventional motor power supply, the regenerative energy generated while the motor 117 operates is wasted as the heat energy by the resistor 110 of the overvoltage-protection circuit 112, thereby decreasing energy efficiency. Further, in the conventional motor power supply 100, there are needed the resistor 104 to limit the inrush current and the resistor 110 to protect against the overvoltage, so that a size of the motor power supply 100 is increased.

SUMMARY OF THE INVENTION

Accordingly, it is an aspect of the present invention to provide a motor power supply and a method of controlling the same, in which a regenerative energy which overloads a DC-conversion circuit is used as an input energy, thereby enhancing energy efficiency.

Additional aspects and/or advantages of the invention will be set forth in part in the description which follows and, in part, will be obvious form the description, or may be learned by practice of the invention.

The foregoing and/or other aspects of the present invention are achieved by providing a motor power supply comprising an AC power input part, a DC-conversion part which converts AC power from the AC power input part into DC power, an inrush current limiting resistor selectively provided between the AC power input part and the DC-conversion part, an overvoltage-protection switching part provided between the inrush current limiting resistor and the DC-conversion part which controls an output voltage of the DC-conversion part; a sensor which senses the output voltage of the DC-conversion part; and a controller which switches On and Off the overvoltage-protection switching part to reduce the output voltage of the DC-correction part by returning energy from the DC-conversion part toward the AC power input part through the inrush current limiting resistor when the output voltage of the DC-conversion part is higher than a predetermined voltage.

According to an aspect of the invention, the DC-conversion part comprises a pair of capacitors to be respectively charged with positive and negative voltages from the AC power.

According to an aspect of the invention, the overvoltage-protection switching part may comprise a pair of field effect transistors (FETs).

According to an aspect of the invention, the controller switches On/Off the overvoltage-protection switching part so as to discharge at least one of the capacitors when a total voltage applied to the capacitors reaches a predetermined overvoltage limit.

According to an aspect of the invention, the sensor comprises a comparator to sense an overvoltage applied to the DC-conversion part.

According to an aspect of the invention, the inrush current preventing part comprises an inrush current limiting resistor between the AC power input part and the DC-conversion part and a relay which selectively bypasses the inrush current limiting resistor.

According to an aspect of the invention, the controller switches the relay On when the total voltage applied to the capacitors reaches a predetermined voltage limit, and switches the relay Off when the total voltage applied to the capacitors reaches the predetermined overvoltage limit.

According to another aspect of the invention, the foregoing and/or other aspects of the invention may be achieved by providing a method of controlling a motor power supply comprising an AC power input part, a DC-conversion part which converts AC power from the AC power input part into DC power, an inrush current limiting resistor provided between the AC power input part and the DC-conversion part, and an overvoltage-protection switching part connected in parallel with an output of the DC-conversion part the method comprising: gradually increasing an output voltage of the DC-conversion part when power is initially supplied via the inrush current limiting resistor; sensing the output voltage of the DC-conversion part; and switching the overvoltage-protection switching part alternately On/Off when the sensed voltage is higher than a predetermined voltage so as to reduce the output voltage of the DC-conversion part by returning energy toward the AC power input part.

According to an aspect of the invention, the motor power supply further comprises a relay connected in parallel with the inrush current limiting resistor, and the method further comprises switching the relay On when the output voltage of the DC-conversion part reaches a predetermined voltage, so that the AC power input part and the DC-conversion part are directly connected.

According to an aspect of the invention, the method further comprises switching the relay Off when the output voltage of the DC-conversion part is reduced by operation of the overvoltage protection switching part.

BRIEF DESCRIPTION OF THE DRAWINGS

The above and/or other aspects and advantages of the present invention will become apparent and more readily appreciated from the following description of the embodiments, taken in conjunction with the accompany drawings of which:

FIGS. 2A–2F illustrate voltage and current waveforms at junctions of the motor power supply according to the present invention when power is initially supplied;

FIGS. 3A–3I illustrate voltage and current waveforms at junctions of the motor power supply according to the present invention when overvoltage is applied to a DC-conversion part of FIG. 1;

FIG. 5 is a comparative table showing a number of components in the motor power supply according to the present invention and a number of components of a conventional motor power supply shown in FIG. 6.

DESCRIPTION OF THE PREFERRED EMBODIMENT

Figure 1:
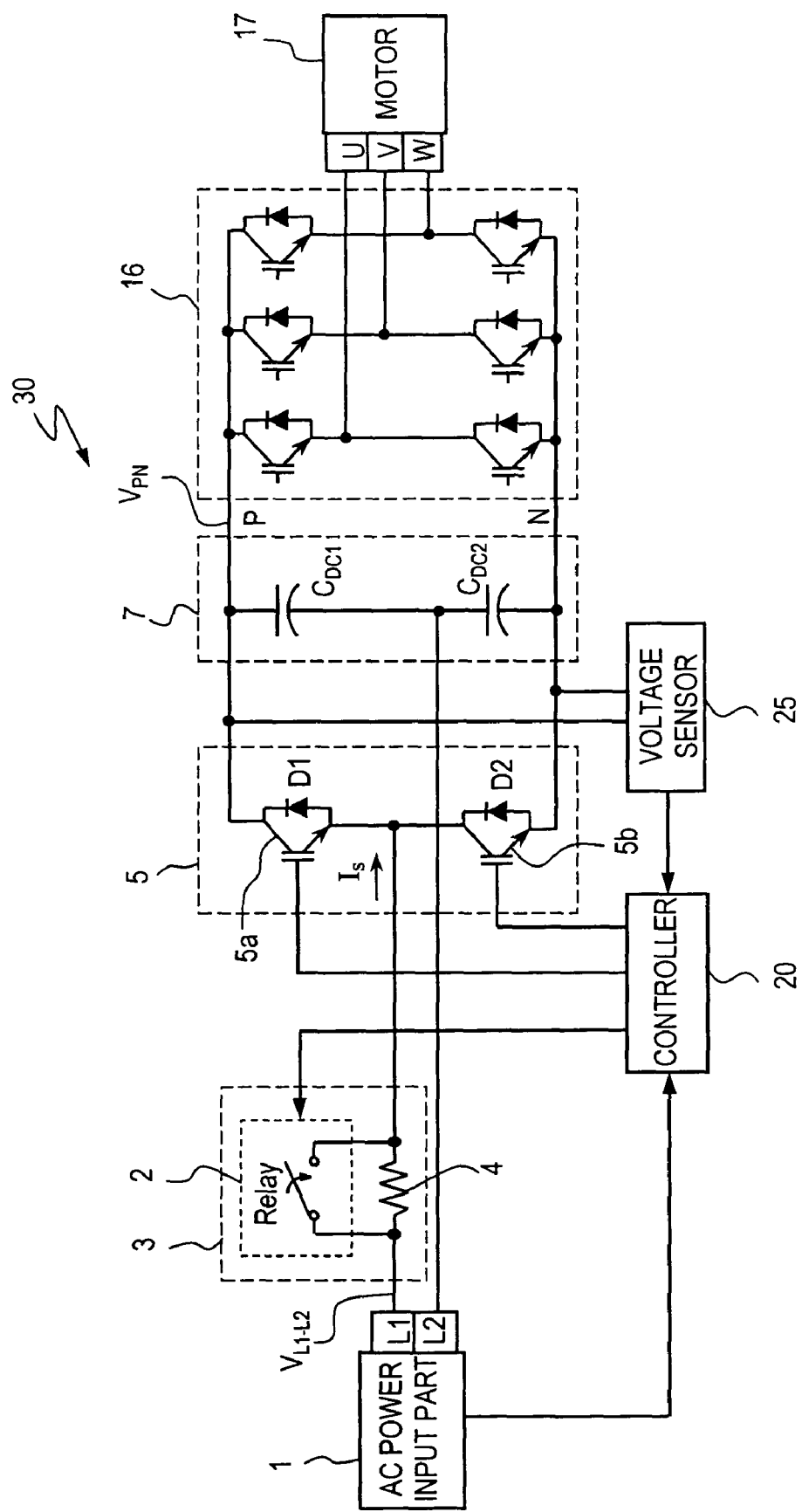
FIG. 1 is a circuit diagram of a motor power supply according to the present invention.

Reference will now be made in detail to the embodiments of the present invention, examples of which are illustrated in the accompanying drawings, wherein like reference numerals refer to like elements throughout.

FIG. 1 is a circuit diagram of a motor power supply 30 according to the present invention. As shown therein, the motor power supply 30 comprises an AC power input part 1 having outputs L1 and L2, a soft charging circuit 3 having a first end connected to the output L1 of the AC power input part 1 and a second end connected with a pair of overvoltage-protection switches 5a and 5b which form an overvoltage-protection switching part 5, a DC-conversion capacitor circuit 7 comprising capacitors $C_{DC1}$ and $C_{DC2}$ connected with the overvoltage-protection switching part 5 in parallel, an inverter 16 connected with the DC-conversion capacitor circuit 7 and which converts DC power into AC power having a variable frequency to be supplied to a 3-phase motor 17, and a controller 20 which controls the overvoltage-protection switching part 5 so as to return a voltage applied to the DC-conversion capacitor circuit 7 to the AC power input part 1 when the voltage applied to the DC-conversion capacitor circuit 7 is higher than a predetermined voltage. Further, the motor power supply 30 comprises a voltage sensor 25, such as for example, a comparator to sense the voltage applied to the DC-conversion capacitor circuit 7 and to transmit sensed data to the controller 20.

The soft charging circuit 3 prevents an excessive inrush current from flowing when power is initially supplied, and comprises an inrush current limiting resistor 4 which limits the inrush current, and a relay 2 which selectively bypasses the inrush current limiting resistor 4.

The soft charging circuit 3 operates as follows. When power is initially supplied, the relay 2 is in a state of being switched Off, so that the limiting resistor 4 is not bypassed. Thus, DC-conversion capacitors $C_{DC1}$ and $C_{DC2}$ are charged with a positive voltage passing through the inrush current limiting resistor 4 and a diode D1 and a negative voltage passing through the inrush current limiting resistor 4 and a diode D2, respectively. A total voltage applied to the pair of capacitors $C_{DC1}$ and $C_{DC2}$ in the DC-conversion capacitor circuit 7 will be referred to as $V_{PN}$. When $V_{PN}$ is equal to a charging stop voltage V1, the relay 2 is switched On, so that the inrush current limiting resistor 4 is bypassed and power from output L1 of the AC power input part 1 is directly supplied to the overvoltage-protection switching part 5 at a connection point between the overload protection switch 5a and the overload protection switch 5b.

According to the present invention, each of the overload-protection switches 5a and 5b may comprise a field effect transistors (FET), having a collector and an emitter connected with a cathode and an anode, respectively, of a respective one of the diodes D1 and D2. The diodes D1 and D2 serve as rectifier diodes to charge the DC-conversion capacitor circuit 7 from the AC power input part 1 and to prevent reverse-current due to the voltage charged to the DC-conversion capacitor circuit 7 from being returned to the AC power input part 1. The diodes D1 and D2 are integrally formed with the overload-protection switches 5a and 5b, respectively. Where the switches are FETs, the diodes D1 and D2 are inherent diodes of the FETs.

The voltage sensor 25 senses whether the $V_{PN}$ applied to the DC-conversion capacitor circuit 7 is higher than a predetermined voltage (i.e., a critical overvoltage), and the overvoltage-protection switching part 5 alternately switches On/Off at least one of the overvoltage protection switches 5a and 5b so as to return energy from the DC-conversion capacitor circuit 7 to the AC power input part 1 when $V_{PN}$ is higher than the critical overvoltage.

The controller 20 controls the relay 2 and the switches 5a and 5b of the overvoltage-protection switching part 5 so as to control $V_{PN}$ to be within an overvoltage protection band between $V_{H1}$ and $V_{H2}$ (i.e., a hysteresis band,) as shown in FIG. 3B. The controller 20 includes a logic circuit which alternately outputs 0 and 1 signals to switch On and Off the overvoltage-protection switching part 5, so that the overload protection switches 5a and 5b are alternately switched On/Off, thereby returning a regenerative power due to the motor 17 to the AC power input part 1. That is, the controller 20 switches on the overload protection switch 5a when a positive voltage (L1>L2) is input, and switches on the overload protection switch 5b when a negative voltage (L1<L2) is, thereby returning the regenerative power charged in the DC-conversion capacitor circuit 7 by the motor 17 to the AC power input part 1.

The controller 20 controls the motor power supply 30 as shown in FIG. 1 as follows. With reference to FIGS. 2E and 2F, when power is initially supplied at t1, the controller 20 controls the relay 2 to pass the power from the AC power input part 1 through the inrush current limiting resistor 4 and the diodes D1 and D2 to charge the DC-conversion capacitor circuit 7 with power supplied via the inrush current limiting resistor 4. As shown in FIG. 2E, the voltage $V_{PN}$ to the DC-conversion capacitor circuit 7 increases toward a voltage V1 at a rate determined by a value of the limiting resistor 4 and a capacitance of the DC-conversion capacitor circuit 7. When the controller 20 senses that the voltage charged to the DC-conversion capacitor circuit 7 reaches a lower limit voltage V1 at t2, the controller 20 switches the relay 2 On, so that the input power is directly supplied to the DC-conversion capacitor circuit 7, bypassing the limiting resistor 4. If the voltage applied to the DC-conversion capacitor circuit 7 reaches an upper limit voltage V2 as shown in FIG. 3B as the DC-conversion capacitor circuit 7 is continuously charged with the power directly supplied from the AC power input part 1, the controller 20 switches the relay 2 Off at t3. Thereafter, If the voltage applied to the DC-conversion capacitor circuit 7 is increased by the regenerative energy due to the motor 17 and then reaches the overvoltage protection band ($V_{H1}$–$V_{H2}$), the controller 20 alternately switches the switches 5a and 5b On/Off (e.g., t4/t4a, t5/t5a, t6/t6a and t7/t7a of FIG. 3F) connected with the DC-conversion capacitor circuit 7, thereby returning the regenerative energy to the AC power input part 1 via the inrush current limiting resistor 4.

FIGS. 2A–2F illustrates voltage and current waveforms at junctions of the motor power supply when the power is initially supplied. As shown in FIG. 2A, the power through the AC power input part 1 ($V_{L1-L2}$) has a sinusoidal waveform which alternates between a positive value and a negative value. When the power is initially supplied through the AC power input part 1 beginning at t1, the relay 2 is in the state of being switched Off as shown in FIG. 2F, so that an AC current flows via the inrush current limiting resistor 4. As the AC current flows, the DC-conversion capacitors $C_{DC1}$ and $C_{DC2}$ are gradually charged with an electric charge, so that the voltage applied to each of the capacitors $C_{DC1}$ and $C_{DC2}$ is gradually increased as shown in FIGS. 2B and 2C, respectively, where $V_{P-L2}$ is the voltage to the capacitor $C_{DC1}$ and $V_{L2-N}$ is the voltage to the capacitor $C_{DC2}$. A decreasing current $I_s$ flowing during charging of the capacitors $C_{DC1}$ and $C_{DC2}$ is shown in FIG. 2D. When the capacitors $C_{DC1}$ and $C_{DC2}$ are fully charged according to the input voltage $V_{L1-L2}$, the voltage to the DC-conversion capacitor circuit 7, i.e., the series combination of capacitors $C_{DC1}$ and $C_{DC2}$, is about double a peak value of the input voltage $V_{L1-L2}$, or about a peak to peak value of the input voltage $V_{L1-L2}$.

The controller 20 switches the relay 2 On when the voltage applied to the DC-conversion capacitor circuit 7 reaches the lower limit voltage V1 (t2 in FIGS. 2E and 2F). When the relay 2 is switched on, the AC power input part 1 and the DC-conversion capacitor circuit 7 are directly connected and the DC-conversion capacitor circuit 7 is more rapidly charged due to bypassing the limiting resistor 4. At this time, the total voltage $V_{PN}$ applied to the pair of capacitors $C_{DC1}$ and $C_{DC2}$ may have an overshoot waveform because of the more rapid charging and some discharging may be necessary.

FIGS. 3A–3I illustrate voltage and current waveforms at junctions of the motor power supply when overvoltage is applied to the DC-conversion capacitor circuit 7. When the regenerative energy, which is generated by the motor 17, passes through the inverter 16 and is applied to the DC-conversion capacitor circuit 7, causes the total voltage $V_{PN}$ to be increased and to reach the upper voltage limit V2, the controller 20 switches the relay 2 Off, as indicated by t3 of FIGS. 3B and 3D. While a positive going voltage is supplied as the voltage $V_{L1-L2}$ in the state that the relay 2 is switched Off, the moment when total voltage $V_{PN}$ reaches the upper overvoltage limit $V_{H2}$ of the hysteresis band, the controller 20 switches the switch 5a On (e.g., t4 and t6 of FIG. 3G). As the first switch 5a is switched on, the overvoltage applied to the DC-conversion capacitor circuit 7 is gradually discharged, and a current due to discharging flows toward the AC power input part 1 (e.g., t4 and t6 of FIG. 3I). In other words, the regenerated energy is returned to the AC power input part 1, thereby discharging the overvoltage applied to the DC-conversion capacitor circuit 7. Thereafter, as the overvoltage applied to the DC-conversion capacitor circuit 7 is discharged, when total voltage $V_{PN}$ reaches a lower overvoltage limit $V_{H1}$ of the hysteresis band ($V_{H1}$–$V_{H2}$), the controller 20 switches the switch 5a Off (e.g., t4a and t6a of FIG. 3G).

Further, while a negative going voltage is supplied as the voltage $V_{L1-L2}$, the moment when the total voltage $V_{PN}$ reaches the upper overvoltage limit $V_{H2}$ of the hysteresis band ($V_{H1}$–$V_{H2}$), the controller 20 switches the switch 5b On (e.g., t5 and t7 of FIG. 3H). As the switch 5b is switched On, the overvoltage applied to the DC-conversion capacitor circuit 7 is gradually discharged, and a current due to the discharging flows toward the AC power input part 1 (e.g. at t5 and t7 of FIG. 3I). In other words, the regenerated energy is returned to the AC power input part 1. Thereafter, as the overvoltage applied to the DC-conversion capacitor circuit 7 is discharged, when the total voltage $V_{PN}$ reaches the lower overvoltage limit $V_{H1}$ of the hysteresis band ($V_{H1}$–$V_{H2}$), the controller 20 switches the switch 5b Off (t5a and t7a of FIG. 3H).

Thereafter, when the total voltage $V_{PN}$ decreases because the regenerative energy generated by the motor 17 is returned to the AC power input part 1 and the total voltage $V_{PN}$ falls below the upper voltage limit V2, the relay 3 is again switched On to bypass the limiting resistor 4 (e.g., t8 of FIG. 3D).

As the total voltage $V_{PN}$ applied to the DC-conversion capacitor circuit 7 is decreased and reaches the upper limit voltage V2, the controller 20 switches the relay 2 On (e.g., t8 of FIG. 3D), so that the AC power input part 1 and the DC-conversion capacitor circuit 7 are again directly connected. Then, the direct connection causes a supplementary voltage to be applied to the DC-conversion capacitor circuit 7, thereby causing the total voltage $V_{PN}$ to have the overshoot waveform.

As shown in of FIG. 3I, when a current waveform of the regenerative power bypassed through the inrush current limiting resistor 4 has a same positive or negative sign as a current waveform of the power inputted through the AC power input part 1, energy will be regenerated. Oppositely, when both current waveforms are different from each other in a positive or negative sign, energy will be lost.

As shown in FIG. 3, when total voltage $V_{PN}$ is higher than a sum of half-wave rectified positive (FIG. 3B) and negative (FIG. 3C) input voltages, the input current $I_s$ becomes 0 (FIG. 3I). Therefore, when the total voltage $V_{PN}$ exceeds the upper limit voltage V2, a voltage spike is not generated when the relay 2 is switched from On to Off. Hence, an additional snubber circuit or a current channel is not needed.

Figure 4A:
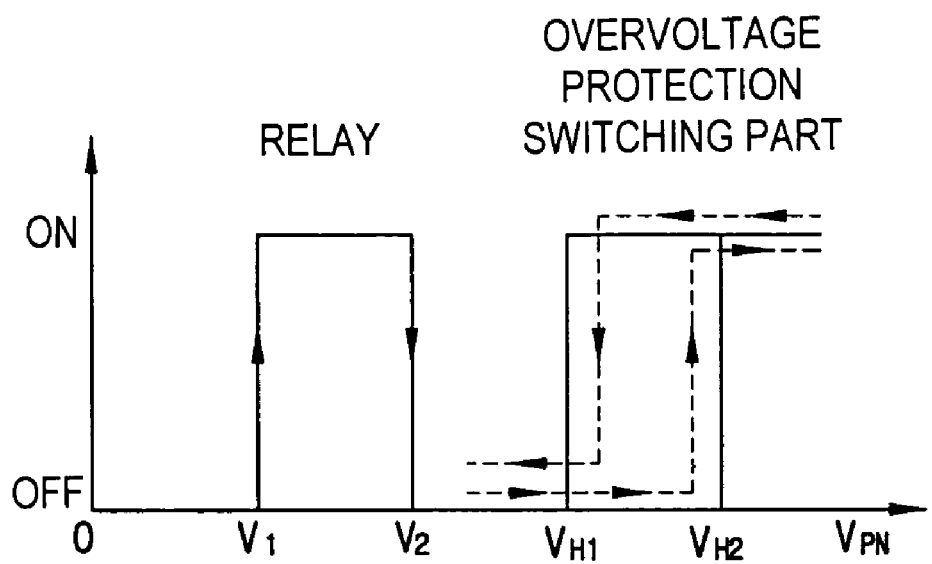
FIGS. 4A and 4B are diagrams for explaining when a relay and an overvoltage-protection switching part are switched according to the present invention.
Figure 4B:
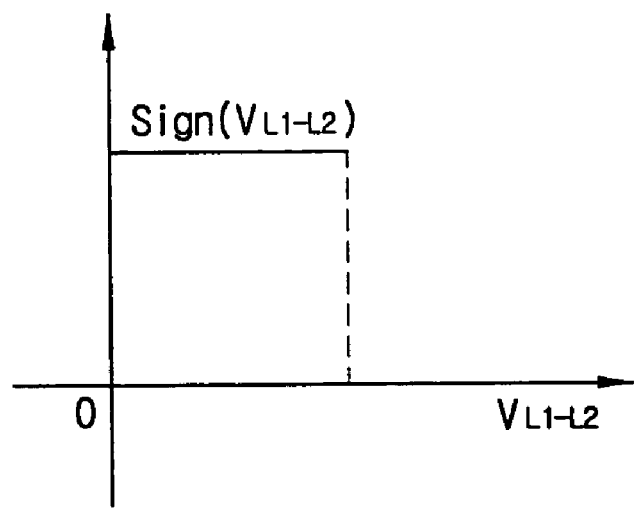

FIGS. 4A and 4B are diagrams for explaining when the relay 2 and the overvoltage-protection switching part 5 according to the present invention are turned On. As shown in FIG. 4A, the controller 20 switches the relay 2 Off while the voltage $V_{PN}$ applied to the DC-conversion capacitor circuit 7 is below the voltage V1, switches the relay 2 On while the voltage $V_{PN}$ is within the voltage band between V1 and V2, and switches the relay 2 Off when the voltage $V_{PN}$ VPN exceeds the voltage V2. The controller switches the overvoltage-protection switching part 5 On to keep the total voltage $V_{PN}$ applied to the DC-conversion capacitor circuit 7 within the overvoltage band between $V_{H1}$ and $V_{H2}$, i.e., enables the overvoltage-protection switching part 5 when the total voltage $V_{PN}$ is greater than $V_{H1}$ so that the DC-conversion capacitor circuit 7 begins to be discharged when the total voltage $V_{PN}$ increases to $V_{H2}$ and stops the discharging when the total voltage $V_{PN}$ decreases to $V_{H1}$ while the DC-conversion capacitor circuit 7 is being discharged by the overvoltage-protection part 5. During operation of the overvoltage switching part 5, the switch 5a is switched synchronously with a positive sign of $V_{L1-L2}$ as shown in FIG. 4B and the switch 5b is switched synchronously with a negative sign of $V_{L1-L2}$.

Figure 6:
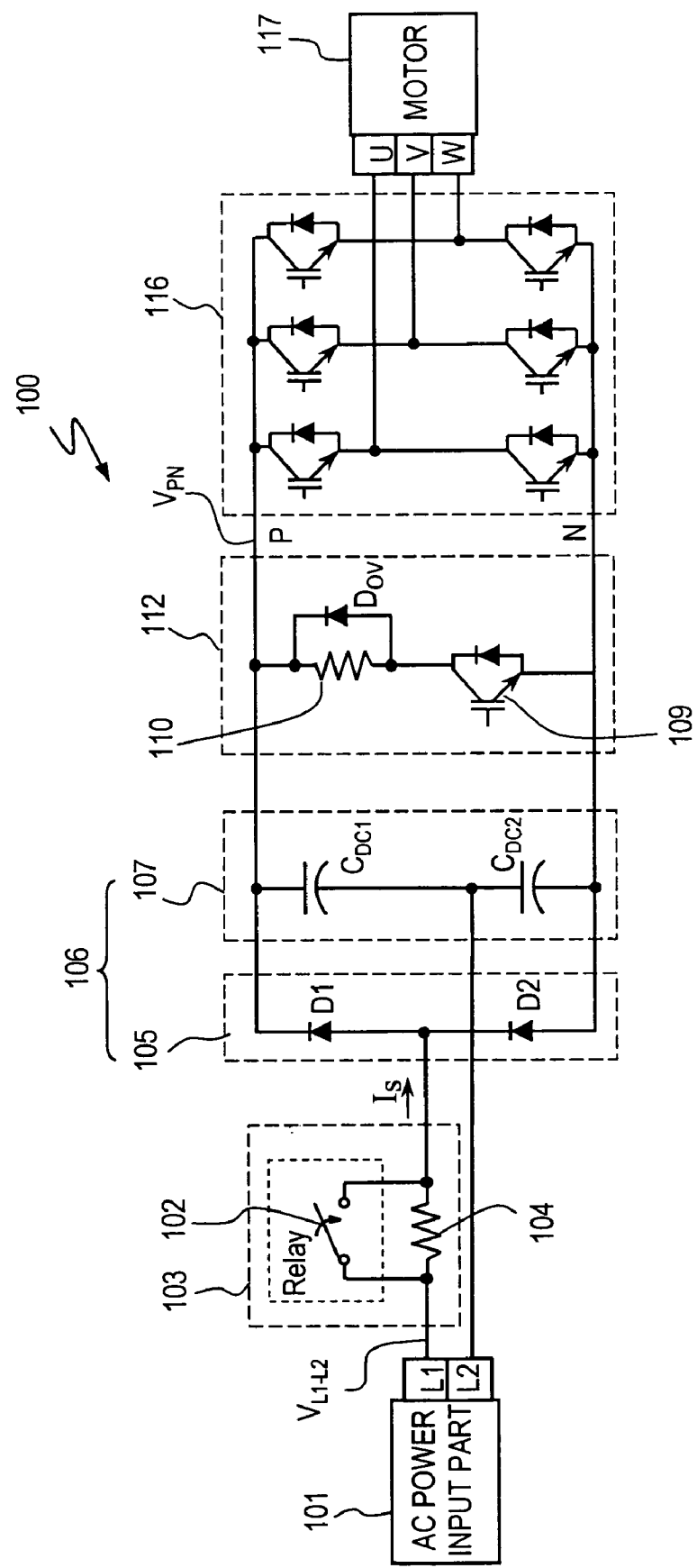
FIG. 6 is a circuit diagram of the conventional motor power supply.

FIG. 5 is a comparative table showing a number of components used in the motor power supply according to the present invention and a number of components used in the conventional motor power supply shown in FIG. 6. As shown in FIG. 5, a total element number of components of the motor power supply according to the present invention is reduced by three as compared with the conventional motor power supply shown in FIG. 6. The numbers shown in FIG. 5 are exclusive of the components shown in the inverters 16 and 116, which have a same number of components. The diodes D1 and D2 shown in FIG. 1 are not included in the component count since the diodes D1 and D2 are integrally formed with or inherent in the switches 5a and 5b, respectively.

In the motor power supply according to the present invention, while the motor operates or is working, if the regenerative energy generated by the inverter causes the DC-conversion circuit to be overloaded, the overvoltage-protection switching part is alternately switched On and Off. Therefore, the overvoltage applied to the DC-conversion circuit is returned toward the AC power input part, so that some regenerative energy is regenerated and some regenerative energy is dissipated as heat energy by the inrush current limiting resistor.

As described above, the present invention provides a motor power supply and a method of controlling the same, in which a regenerative energy causing a DC-conversion circuit to be overloaded is used as an input energy, thereby enhancing energy efficiency.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A motor power supply comprising:
    a DC-conversion part which converts AC power from an AC power input part into DC power;
    an inrush current limiting resistance provided between the AC power input and the DC-conversion part;
    an overvoltage-protection switching part provided between the inrush current limiting resistance and the DC-conversion part;
    a sensor which senses an output voltage of the DC-conversion part;
    a controller which switches the overvoltage-protection switching part On/Off to return energy stored in the DC-conversion part to the AC power input part through the inrush current limiting resistance when the output voltage of to the DC-conversion part is higher than a predetermined voltage; and
    a relay which selectively bypasses the limiting resistance, wherein the controller switches the relay to bypass the resistance when the output voltage reaches a predetermined voltage value, and switches the relay so that the resistance is not bypassed when the output voltage reaches the predetermined overvoltage limit.

2. The motor power supply according to claim 1, wherein:
    the DC-conversion part comprises a pair of capacitors which are respectively charged with positive and negative voltages from the AC power.

3. The motor power supply according to claim 2, wherein:
    the overvoltage-protection switching part comprises a pair of field effect transistors.

4. The motor power supply according to claim 3, wherein:
    the controller switches On/Off the overvoltage-protection switching part to discharge at least one of the capacitors when the output voltage reaches a predetermined overvoltage limit.

5. The motor power supply according to claim 4, wherein:
    the sensor comprises a comparator which determines whether the output voltage reaches the predetermined overvoltage limit.

6. A method of controlling a motor power supply comprising an AC power input part, a DC-conversion part which converts AC power from the AC power input part into DC power, an inrush current limiting resistance provided between the AC power input part and the DC-conversion part, and an overvoltage-protection switching part connected with the DC-conversion part in parallel, the method comprising:
    charging the DC-conversion part when power is initially supplied via the inrush current limiting resistance;
    sensing a voltage charged in the DC-conversion part; and
    switching the overvoltage-protection switching part alternately On/Off when the sensed voltage is higher than a first predetermined voltage value, to reduce the voltage charged in the DC-conversion part by returning energy stored in the DC-conversion part toward the AC power input part.

7. The method according to claim 6, wherein:
the motor power supply further comprises a relay which selectively bypasses the inrush current limiting resistance, and
the method further comprises:
bypassing the inrush current limiting resistance when the voltage charged in the DC-conversion part reaches a second predetermined voltage value, so that the AC power input part and the DC-conversion part are directly connected.

8. The method according to claim 7, further comprising:
stopping the bypassing of the current limiting resistance when the voltage charged in the DC-conversion part is greater than the first predetermined voltage value.

9. The method according to claim 7, further comprising:
stopping the bypassing of the current limiting resistance when the voltage charged in the DC-conversion part is less than the second predetermined voltage value.

10. The method according to claim 7, wherein the switching of the overvoltage-protection switching part alternately On/Off comprises:
switching the overvoltage-overvoltage protection switching part On, where the voltage charged in the DC-conversion part becomes greater than a second predetermined value; and
switching the overvoltage-overvoltage protection switching part OFF, where the voltage charged in the DC-conversion part becomes less than the first predetermined value.

11. The method according to claim 8, wherein the switching of the overvoltage-protection switching part alternately On/Off comprises:
switching the overvoltage-overvoltage protection switching part On, where the voltage charged in the DC-conversion part becomes greater than a second predetermined value; and
switching the overvoltage-overvoltage protection switching part OFF, where the voltage charged in the DC-conversion part becomes less than the first predetermined value.

12. A motor power supply for supplying an AC motor with power provided from an AC power source through an inverter, the motor power supply comprising:
a DC conversion circuit which converts power from the AC power source to DC power and outputs the DC power to the inverter;
a sensor which senses a voltage at an output of the DC conversion circuit;
an overvoltage protection circuit which returns energy from the DC conversion circuit to the AC power source if the sensed output voltage exceeds a first predetermined value; and
a resistance selectively connectable between the AC power source and the DC conversion circuit.

13. The motor power supply according to claim 12, further comprising:
a controller which controls the overvoltage protection circuit in response to the sensed voltage.

14. The motor power supply according to claim 13, wherein:
the overvoltage protection circuit comprises at least one switch which selectively forms a current path between the output of the DC conversion circuit and the AC current source; and
the controller switches the at least one switch synchronously with a phase of the AC power source to return the energy from the DC conversion circuit to the AC power source.

15. The motor power supply according to claim 14, wherein the at least one switch is a field effect transistor (FET).

16. The motor power supply according to claim 15, wherein a diode formed integrally with the FET forms a part of the DC conversion circuit.

17. The motor power supply according to claim 12, wherein:
the DC conversion circuit comprises a capacitance circuit which stores the energy;
the overvoltage protection circuit comprises first and second switches, the first switch selectively forming a first current path between a first end of the capacitance and the AC current source and the second switch selectively forming a current path between a second end of the capacitance and the current source; and
the controller switches the first and second switches synchronously with the AC power source to return the energy from the DC conversion circuit to the AC power source.

18. The motor power supply according to claim 17, wherein:
the AC power source comprises outputs L1 and L2;
the controller switches the first switch where a voltage at L1 is greater than a voltage at L2 and switches the second switch where the voltage at L2 is greater that the voltage at L1.

19. The motor power supply according to claim 12, wherein: the motor power supply further comprises:
a controller; and
the overvoltage protection circuit comprises at least one switch which selectively forms a current path between the output of the DC conversion circuit and the AC current source;
wherein, the controller:
switches the at least one switch synchronously with a phase of the AC power source to return the energy from the DC conversion circuit to the AC power source, and
controls the resistance to be connected between the AC power source and the DC conversion circuit where the output voltage is less than a second predetermined value or greater than the first predetermined value.

* * * * *

UNITED STATES PATENT AND TRADEMARK OFFICE
CERTIFICATE OF CORRECTION

| | |
|---|---|
| PATENT NO. | : 7,068,010 B2 |
| APPLICATION NO. | : 10/662447 |
| DATED | : June 27, 2006 |
| INVENTOR(S) | : Jang-hyoun Youm |

Page 1 of 1

It is certified that error appears in the above-identified patent and that said Letters Patent is hereby corrected as shown below:

Column 8, Line 27, after "of" delete "to".

Column 9, Line 19, change "claim 7," to --claim 6,--.

Signed and Sealed this

Twentieth Day of February, 2007

JON W. DUDAS
*Director of the United States Patent and Trademark Office*